United States Patent Office 3,695,853
Patented Oct. 3, 1972

3,695,853
TRANSITION METAL COMPLEXES OF PHOSPHINE
Frank Karl Klanberg, Frankfurt am Main, Germany, assignor to E. I. du Pont de Nemours and Company, Wilmington, Del.
No Drawing. Continuation-in-part of application Ser. No. 704,267, Feb. 9, 1968. This application Apr. 1, 1970, Ser. No. 24,811
Int. Cl. C01b 25/06; C07l 11/00, 15/00
U.S. Cl. 423—299                    18 Claims

ABSTRACT OF THE DISCLOSURE

Transition metal complexes of phosphine are formed by displacement of ligands from certain transition metal complexes with phosphine. The products are useful as sources of phosphine and as catalysts for the polymerization of olefins.

CROSS-REFERENCE TO RELATED APPLICATION

This application is a continuation-in-part of copending application Ser. No. 704,267, filed Feb. 9, 1968 now abandoned.

BACKGROUND OF THE INVENTION

Field of the invention

This invention relates to transition metal complexes containing phosphine and to a process for their preparation.

Description of the prior art

G. Booth in "Advances in Inorganic Chemistry and Radiochemistry," H. J. Emeleus and A. G. Sharpe, Editors, Academic Press, New York, volume 6, 1964, pp. 1–69, reviews work on hydrocarbyl-substituted phosphine ($PR_3$) complexes of Groups IV–B, V–B, VI–B, VII–B and VIII metals. The alkyl and/or aryl phosphine complexes were made from salts of most transition metals including in some instances carbonyl-containing salts. In contrast to the numerous known metal complexes containing hydrocarbyl-substituted phosphine ligands, very few metal complexes of unsubstituted phosphine ($PH_3$) have been described in the literature.

L. E. Orgel in "An Introduction to Transition-Metal Chemistry: Ligand Field Theory," second edition, John Wiley and Sons, Inc., New York, 1966, p. 148, states that $PH_3$ does not readily form well-characterized coordination compounds. He attributes this to (1) the great mobility of the hydrogen atoms which allows secondary transitions to occur that are impossible with alkyl or aryl phosphine compounds and (2) the greater energy required to reorganize $PH_3$ into four more or less equivalent tetrahedrally arranged bonds as compared to the energy required for $PR_3$.

Gmelin, Handbuch der Anorganischen Chemie, vol. 16, Part C, pp. 45–47, reports that compounds of chromium, uranium, manganese, nickel, cobalt and iron usually react with $PH_3$ to form metal phosphides but that anhydrous halides of $Cu^+$, $Al^{3+}$, $Ti^{4+}$ and $Sn^{4+}$ may combine with $PH_3$ to form complexes such as $CuCl \cdot PH_3$, $CuCl \cdot 2PH_3$, $AlCl_3 \cdot PH_3$, $TiCl_4 \cdot PH_3$, $TiCl_4 \cdot 2PH_3$, and $SnCl_4 \cdot 3PH_3$.

N. V. Sidgwick, "The Chemical Elements and Their Compounds," Oxford University Press, Great Britain, vol. 1, 1950, p. 755, reports that the number of known coordination compounds of $PH_3$ is small because of their ease of oxidation.

SUMMARY OF THE INVENTION

According to this invention there are provided phosphine-containing complexes of the transition metals of Group VI–B, Group VII–B, and the ferrous metals of Group VIII of the Periodic Table having the formula $$M(PH_3)_a X_b L_c L'_d L''_e$$

wherein

M is a transition metal of atomic number 24–28, 42, 43, 74, and 75;
X is selected from the group of 1-electron donor ligands comprising Cl, Br, I, H, alkyl of up to 6 carbon atoms, cycloalkyl of up to 10 carbon atoms, aralkyl of up to 12 carbon atoms, and aryl and alkaryl of up to 14 carbon atoms;
L is selected from the group of 2-electron donor ligands comprising
CO,
RNC, wherein R is aryl of up to 14 carbon atoms or alkyl of up to 18 carbon atoms, and
$ZR^1R^2R^3$, wherein Z is phosphorus, arsenic, or antimony, $R^1$, $R^2$, and $R^3$ are selected from the group consisting of alkyl and cycloalkyl of up to 6 carbon atoms and aryl, alkaryl, and aralkyl of up to 14 carbon atoms, with the proviso that when Z is phosphorus, $R^1$, $R^2$, and $R^3$ can also be selected from the group consisting of alkoxy and aryloxy of up to 12 carbon atoms, or $R^1$ can be hydrogen in which case $R^2$ and $R^3$ are aryl of up to 14 carbon atoms;
L' is selected from the group of 4-electron donor ligands comprising

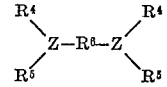

wherein Z is defined above, $R^4$ and $R^5$ are selected from the group consisting of alkyl and cycloalkyl of up to 6 carbon atoms and aryl, aralkyl, and alkaryl of up to 14 carbon atoms, and $R^6$ is selected from the group consisting of phenylene and alkylene of up to 6 carbon atoms;
L" is a 5-electron donor ligand selected from $\pi$-cyclopentadienyl and hydrocarbyl-substituted $\pi$-cyclopentadienyl, wherein hydrocarbyl is free of aliphatic unsaturation and is of up to 6 carbon atoms;
$a$ is 1–3;
$c$ is 0–5;
$b$, $d$, and $e$ are 0–1; with the provisos that the total number of electrons available from ligands and M metals is equal to 18; and
$e$ is 0 when M is Co or Ni; with the further provisos that at least one of $b$, $d$, and $e$ is 1 when M is Cr, Mo, or W and L is exclusively CO or CO plus $ZR^1R^2R^3$.

Further according to this invention there are provided processes for preparing the above phosphine coordination compounds by contacting and thereby reacting phosphine at or below 150° C. in the absence of air with a solution or suspension of a transition metal complex of the formula $$[MX_b Q_f Q'_g L''_h Q''_i (B_3H_8)_j] Q'''_k$$

wherein

M, X, and L" are as defined above;
Q is selected from 2-electron donor ligands, consisting of L as defined above, $N_2$, acyclic and alicyclic monoolefins of up to 9 carbon atoms, $R^7$—CN, or $R^7_2$O, wherein $R^7$ is hydrocarbyl free of aliphatic unsaturation and is of up to 6 carbon atoms;
Q' is selected from 4-electron donor ligands consisting of L' as defined above, $R^7$—S—$CH_2CH_2$—S—$R^7$, or diolefinic hydrocarbons of up to 10 carbon atoms;

Q'' is a 6-electron donor ligand consisting essentially of cyclic triolefins of up to 8 carbon atoms;
$B_3H_8$ is a 3-electron donor ligand;
Q''' is a positively charged cation selected from the group consisting of the alkali metals and $NR^8R^9R^{10}R^{11}$, wherein $R^8$ is alkyl and cycloalkyl of up to 6 carbon atoms, aryl, aralkyl, and alkaryl of up to 14 carbon atoms and $R^9$, $R^{10}$, and $R^{11}$, independently, are $R^8$ or hydrogen;
$f$ is 2–6;
$b$, $g$, $h$, $i$, $j$, and $k$ are 0–1;
the total number of electrons available from ligands and M is equal to 18;

with the proviso that:

$j$ and $k$ are 0 when M is other than Cr, Mo, or W; when $k$ is 1, the total number of electrons available from ligands and M is equal to 17, and the additional electron representing the uninegative charge on the anion satisfies the 18 electron rule;

$h$ is 0 when M is Co or Ni;

at least one additional ligand must be present when Co is present as a ligand.

DESCRIPTION OF THE PREFERRED EMBODIMENTS

New $PH_3$ complexes of chromium, manganese, iron, cobalt, nickel, molybdenum, technetium, tungsten and rhenium of unexpected air and thermal stability and new methods for preparing these coordination complexes have now been discovered.

The formation of the compounds of this invention is surprising in view of the fact that phosphine is a very weak base and a strong reducing agent which reacts with many common metal salts to form the elemental metals or their metal phosphides.

A comparison of the pK value of phosphine and ammonia which is a well-known metal complexing agent shows that phosphine has a base strength many orders of magnitude smaller than ammonia—see for instance F. A. Cotton and G. Wilkinson, Advanced Inorganic Chemistry, Second Edition, Interscience Publishers, Div. of John Wiley and Sons, New York, 1966, p. 507 or L. E. Orgel, An Introduction to Transition Metal Chemistry Ligand Field Theory, Second Edition, John Wiley and Sons, New York, 1966, p. 148. Consequently, any metal complexes of phosphine in which phosphine functions as a sigma-donor would be expected to be of low stability and to evolve phosphine at temperatures of the order of about 25° C. This predicted instability of phosphine metal complexes is believed to be due to the fact that phosphine should be a fairly weak sigma-donor and a poor-pi-acceptor in a metal complex.

The majority of the present transition metal complexes containing phosphine as a ligand are unexpectedly stable in air at 25° C. and at temperatures in the range of 75–100° C. in the absence of air. By "ligand" is meant any atom, ion, or molecule capable of functioning as the electron donor portion in one or more coordinate bonds with, however, the qualification that the ligand can accept as well as donate electrons. Typical ligands are discussed in F. A. Cotton and G. Wilkinson, loc. cit., pp. 139–142.

The requirement that for stable transition metal complexes, the total number of electrons available from the ligands and the valence shell of the uncomplexed metal ion shall equal 18 has been described as the "18-electron rule"—see, for instance, M. L. H. Green, "The Transition Elements," vol. 2 of "Organometallic Compounds," G. E. Coates, M. L. H. Green, and K. Wade, Editors, Methuen & Co., Ltd., London, 1968, p. 2. The number of electrons donated by various ligands is therein defined and corresponds to those used in the definition of this invention. Phosphine is a 2-electron donor. The total number of valence-shell electrons available from the uncomplexed metal atoms is taken as 6 for Cr, Mo, and W, 7 for Mn, Tc, and Re, 8 for Fe, 9 for Co, and 10 for Ni. These values are readily determined from the electronic configurations of the elements as summarized in T. Moeller, "Inorganic Chemistry—An Advanced Text," John Wiley & Sons, Inc., New York, 1952, pp. 98–101.

Phosphine is a colorless, poisonous gas which boils at −87.7° C. and melts at −133° C. CAUTION—Extreme care must be exercised when free phosphine is used because it is a strong reducing agent which may ignite in air and explode in oxygen. It has been reported that 10 parts-per-million of phosphine breathed continuously cause death.

Various precursors can be used with commercially available phosphine in the process for the preparation of the phosphine complexes. For example, Group VI-B hexacarbonyls react with the $B_3H_8^-$ ion to give salts of the yellow, air-stable anion $[M(CO)_4B_3H_8]^-$, wherein M is Cr, Mo, or W, and these anions are useful as precursors. A general procedure for preparing tetraalkylammonium salts of $[M(CO)_4B_3H_8]^-$ is as follows: equimolar mixtures of a metal hexacarbonyl and $CsB_3H_8$ are dissolved in a mixture of 1,2 - dimethoxyethane/1,5-dimethoxy-3-oxopentane, and the resultant mixture is heated at reflux under nitrogen for about 3 hours. After cooling, the mixture is filtered, and the filtrate is poured into a large volume of water containing an amount of tetramethylammonium chloride in stoichiometric excess of the moles of $[M(CO)_4B_3H_8]^-$ produced. The tetramethylammonium salt precipitates and can be recovered by filtration. It may be recrystallized from methanol and dried at 60° C./0.001 mm. pressure.

The precursor transition metal complexes can contain a wide variety of ligands including, but not limited to, tertiary hydrocarbyl phosphines, tertiary hydrocarbyl phosphites, nitriles, isonitriles, $N_2$, halides, alkyl groups, aryl groups, hydrido, $B_3H_8^-$, organic sulfides, $\pi$-cyclopentadienyl and $\pi$-alkylcyclopentadienyl, carbon monoxide and olefins. Preferred among these groups are triphenylphosphine, triphenyl phosphite, acetonitrile, Cl, ethylene, 2,2,7,7 - tetramethyl-3,6-dithiaoctane, carbon monoxide, $B_3H_8^-$ and 1,2-bis(diphenylphosphino)ethane. Operable $ZR^1R^2R^3$ and

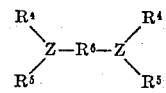

ligands where Z, $R^1$, $R^2$, $R^3$, $R^4$, $R^5$, and $R^6$ are as defined previously include the following:

$(C_2H_5)_3P$, $C_6H_5(C_2H_5)_2P$, $(C_2H_5)(C_6H_5)_2P$, $(C_6H_{13})_3P$, (p-$CH_3$—$C_6H_4)_3P$, (i-$C_3H_7)_3P$, $(C_6H_5O)(C_2H_5)_2P$, $(C_6H_5O)(CH_3)_2P$, (i-$C_3H_7)_2(C_6H_5)P$, $(C_2H_5)_3As$, $(C_2H_5O)_3P$,
(i-$C_3H_7O)_3P$, $(C_6H_5)_3As$, (n-$C_4H_9)_3As$, (i-$C_3H_7)_3As$,
$(CH_3)_2PCH_2CH_2P(CH_3)_2$, $(C_2H_5)_2(C_6H_5)As$, $(C_6H_5)_3Sb$, $(C_2H_5)_3Sb$, and $(C_6H_{13})_3As$.

The precursor transition metal complexes used in the processes of this invention are well known in the chemical literature and can be prepared by the methods described therein. For example, precursors such as $Mn(CO)_5Br$ are reported in R. B. King, "Organometallic Synthesis," vol. I, Academic Press, New York, 1965; $(CH_3CN)_3M(CO)_3$ where M is Cr, Mo, or W is reported by D. P. Tate, et al. Inorg. Chem., 1, 433 (1962); $[(C_6H_5O)_3P]_4Ni$ is reported by J. R. Olechowski et al., "Inorganic Synthesis," vol. IX, McGraw-Hill Book Co., 1966, p. 181; and $[(C_2H_5)_4N][Cr(CO)_5Cl]$ is reported by E. W. Abel, et al., J. Chem. Soc., 2068 (1963).

The compounds of this invention are prepared by addition of gaseous phosphine to a solution or suspension of a precursor transition metal complex. Air must be excluded from the reaction mixture. However, after formation, most $PH_3$-containing complexes can be exposed to the atmosphere. Solvents or suspending media for the reaction include water, alcohols, e.g., ethyl, methyl, propyl, and butyl alcohol, ethers, such as diethyl ether, diphenyl ether, tetrahydrofuran and the like, benzene and substituted benzenes such as chlorobenzene, toluene, xylene and the like, alkanes and cycloalkanes such as hexane, cyclohexane, petroleum ether and the like, chlorinated alkanes such as chloroform, methylene chloride, trichloroethane, ethylene dichloride and the like, esters such as methyl acetate, ethyl acetate, methyl propionate and the like, and amides such as N,N-dimethylformamide, N,N - dimethylacetamide, N-methylpyrrolidone, tetramethylurea and the like. Preferably, the reaction is conducted at a temperature of 75° C. or below. Pressure during reaction is not critical and the reaction can be conducted at super-atmospheric, atmospheric or subatmospheric pressures. The reaction, depending upon conditions, can be conducted in glass or in metal reaction vessels.

Most of the products of this invention are stable in air. Some of the products can be isolated by sublimation at low pressures of the order of $10^{-4}$ mm. of Hg. In general, the complexes can be isolated by evaporation of the reaction medium followed by crystallization from organic solvents such as alcohols, alkanes, aromatic hydrocarbons, ethers, haloalkanes and mixtures thereof.

Preparation of the phosphine-containing complexes of the invention involves displacement by phosphine of a ligand such as CO, a nitrile, an isonitrile, a phosphite, an olefin, an ether, a sulfide, a halogen, $N_2$, $B_3H_8^-$, etc., from a transition metal compound. Usually the participating transition metal compound is preformed and isolated prior to reaction with phosphine. However, as shown in Examples XI and XII, one or more participating ligands, e.g., triphenyl phosphite or ether, may be introduced by in situ reaction with suitable transition metal compounds, e.g., bis-(1,5 - cyclooctadiene)nickel, and the phosphine then admitted to effect reaction.

The transition metal-phosphine complexes of this invention can contain up to five attached ligands in addition to phosphine, the exact number depending upon their electron donating capability, the number of attached phosphine groups, and the number of electrons available from the metal atom. Preferred products of the invention possess the formulae $M(PH_3)_a(CO)_c$, $M(PH_3)_aX(CO)_c$, and $M(PH_3)_aL_c$ where M, X, L, $a$ and $c$ have the same meaning given earlier. Especially preferred among X groups is halogen and among L groups is triphenyl phosphite and triphenylphosphine.

In the examples of the invention described hereinafter, many of the reactions are described as yielding a single product containing a specified number of $PH_3$-ligands. It is to be understood, however, that the extent of $PH_3$ substitution and hence the exact formula of the products actually obtained may vary dependent upon small changes in reaction conditions, and that in addition to the particular product described, other degrees of $PH_3$ substitution may also be achieved, resulting in products of higher or lower $PH_3$ content.

All parts and percentages are by weight except where specified otherwise.

EXAMPLE I

$Mo(PH_3)_2(CO)_4$

A 400 ml. stainless steel pressure bomb charged with 8.0 g. (0.029 mole) of $[(CH_3)_4N]$ $[Mo(CO)_4B_3H_8]$, 3.0 g. (0.088 mole) of phosphine and 100 ml. of anhydrous tetrahydrofuran was heated to 70° C. for 2 hrs. After cooling to room temperature, pressure was released and the slurry remaining in the reaction vessel was filtered. The filtrate was evaporated to dryness in a rotary-vacuum evaporator leaving 5.9 g. of a yellow-brown solid. The solid was extracted with 50 ml. of benzene and the extract was evaporated to dryness to produce 5 g. of brown, crystalline residue. This residue was slowly sublimed at 60–80° C. at 0.001 mm. of Hg to give, first, 2.5 g. of $Mo(PH_3)_2(CO)_4$ in the form of faintly yellowish crystals, melting at 111–116° C. 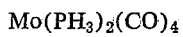

Continued sublimation at temperatures up to 100° C. gave an additional 0.7 g. of $Mo(PH_3)_2(CO)_4$ melting at 119–121° C. (sealed tube) which was analyzed:

*Analysis.*—Calcd. for $Mo(PH_3)_2(CO)_4$ (percent): C, 17.4; H, 2.2; O, 23.2; P, 22.5. Found (percent): C, 17.4; H, 2.2; O, 23.2; P, 22.3.

The IR spectrum of $Mo(PH_3)_2(CO)_4$ in a mineral oil mull exhibits a broad band at 2400 cm.$^{-1}$ and two strong bands at 1015 and 1000 cm.$^{-1}$ which are assigned to the P-H stretching ($A_1+E$) and the two P-H deformation ($A_1+E$) modes of the coordinated $PH_3$ molecule. Pertinent features of the IR spectrum in toluene solution are four CO stretching absorptions at 2085, 2050, 1945 and 1930 cm.$^{-1}$, consistent with $C_{2v}$ symmetry for cis-$Mo(PH_3)_2(CO)_4$ The ultraviolet spectrum of $Mo(PH_3)_2(CO)_4$ in cyclohexane shows absorption at 3480 ($\epsilon$, 1960); 2900 ($\epsilon$, 8940); 2330 A. ($\epsilon$, 46,600). The mass spectrum of $Mo(PH_3)_2(CO)_4$ shows a parent peak at 276 and peaks at m/e=270, 242, 211, 183, 155, 127 and 96 which arise from the fragments $Mo(CO)_4P_2^+$, $Mo(CO)_3P_2^+$, 

$Mo(CO)_3P^+$, $Mo(CO)_2P^+$, $Mo(CO)P^+$, $MoP^+$, and $Mo^+$, respectively. The $H^1$ n.m.r. spectrum of $Mo(PH_3)_2(CO)_4$ in $CDCl_3$ solution (in which D is deuterium) shows a symmetrical multiline pattern centered at $\tau 6.31$ with $J_{P-H}=324$ Hz. The $P^{31}$ spectrum at 40.5 Mc. shows a quartet at +155 p.p.m. from external $H_3PO_4$ as standard with $J_{P-H}=324$ Hz. The quartet displays unanalyzed fine structure.

EXAMPLE II

$W(PH_3)_2(CO)_4$

The same procedure as in Example I was used with 7.4 g. (0.018 mole) of $[(CH_3)_4N]$ $[W(CO)_4B_3H_8]$, 3.5 g. (0.100 mole) of phosphine, and 100 ml. of tetrahydrofuran. The crude product as sublimed at 60–80° C./0.001 mm. Hg gave 2.3 g. colorless relatively coarse crystals melting at 142–144° C. (sealed tube).

*Analysis.*—Calcd. for $W(PH_3)_2(CO)_4$ (percent): C, 13.2; H, 1.7; O, 17.6. Found (percent): C, 13.7; H, 1.4; O, 18.2.

The infrared spectrum of the crystals in a mineral oil mull shows P-H bands identical to those in the spectrum of $Mo(PH_3)_2(CO)_4$; CO absorptions occur at 2120, 2060, 1985 and 1950 cm.$^{-1}$, consistent with a $C_{2v}$ cis-structure of $W(PH_3)_2(CO)_4$. 

$W(PH_3)_2(CO)_4$ absorbs ultraviolet radiation in cyclohexane at 3470 ($\epsilon$, 1910); 2880 ($\epsilon$, 7530); 2300 A. ($\epsilon$, 59,000). The mass spectrum of $W(PH_3)_2(CO)_4$ shows peaks for the following fragments:

358—$W(CO)_4P_2^+$, 330—$W(CO)_3P_2^+$, 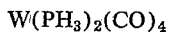

299—$W(CO)_3P^+$, 271—$W(CO)_2P^+$, 243—$W(CO)P^+$

227—$WCP^+$, 215—$WP^+$, 196—$WC^+$, and 184—$W^+$ doubly charged ions give rise to peaks at m./e. 179, 164, 149, 135, 121, 113 and 107.

The $H^1$ n.m.r. spectrum of $W(PH_3)_2(CO)_4$ (in which D is deuterium) shows a symmetrical (due to P-H coupling) multipeak pattern centered at $\tau 6.09$ with $J_{P-H}=338$ Hz. The $P^{31}$ n.m.r. spectrum consists basically of a 1:3:3:1 quartet ($J_{P-H}=334\pm5$ Hz.) at 175 p.p.m. from $H_3PO_4$ as external standard.

EXAMPLE III

$Cr(PH_3)_2(CO)_4$

A 240 ml. shaker tube charged with 2.5 g. (0.009 mole) of $[(CH_3)_4N][Cr(CO)_4B_3H_8]$, 2.0 g. (0.060 mole) of $PH_3$, and 40 ml. of tetrahydrofuran was heated to 70° C. for 2 hrs. The product, a dark yellow slurry, was filtered, and the filtrate evaporated to dryness in vacuo. The residue was subjected to sublimation under 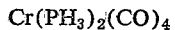

the same conditions as used in Examples I and II to give a sublimate consisting of 20 mg. of transparent light yellow crystals which were identified by infrared analysis as cis-Cr(PH$_3$)$_2$(CO)$_4$. Pertinent features of the spectrum were strong P-H absorptions at 2400, 1035 and 1015 cm.$^{-1}$.

EXAMPLE IV

Mn(PH$_3$)Br(CO)$_4$

Gaseous phosphine was passed into a solution of 6.7 g. (0.024 mole) of Mn(CO)$_5$Br in 100 ml. of refluxing tetrahydrofuran for 1 hour. The incarnadine solution was evaporated to dryness to leave 7.0 g. of orange solid, the infrared spectrum of which showed two bands to P-H absorption at 2410 and 2370 cm.$^{-1}$. The crude material was sublimed at 60–110° C./0.001 mm. to give 1.6 g. of orange-yellow sublimate, melting at 112–115° C., and 4.0 g. of unsublimed material. A substantial amount of phosphine liberated from the reaction product during the course of the sublimation was condensed in a trap cooled with liquid nitrogen. The sublimed product gave the following analysis:

Found (percent): C, 19.3, 19.6; H, 1.0, 1.0; O, 26.5, 26.8; P, 9.5; Br, 22.9; Mn, 18.8.

This analysis indicates a mixture of Mn(PH$_3$)Br(CO)$_4$ and [MnBr(CO)$_4$]$_2$. The unsublimed residue was extracted with three 50 ml. portions of CH$_2$Cl$_2$, and the extracts were combined and evaporated to dryness. The residue obtained was redissolved in benzene, and the resulting solution was chromatographed in an Al$_2$O$_3$ (Woelm, neutral) column. The benzene-effluent on evaporation afforded 1.4 g. of Mn(PH$_3$)Br(CO)$_4$ as a yellow, micro-crystalline solid, melting at 115–118° C.

*Analysis.*—Calcd. for Mn(PH$_3$)Br(CO)$_4$ (percent): C, 17.1; H, 1.1; O, 22.8; P, 11.0; Br, 28.4; Mn, 19.6. Found (percent): C, 17.6; H, 1.3; O, 23.3, 23.6; P, 12.3; Br, 25.3; Mn, 19.2.

The IR spectrum of Mn(PH$_3$)Br(CO)$_4$ in CH$_2$Cl$_2$ solution showed CO vibrations at 2092, 2070, 2400 (shoulder), 2012, 1971 and 1932 cm.$^{-1}$. The UV-spectrum of Mn(PH$_3$)Br(CO)$_4$ in CH$_3$CN showed absorption at 3800 A. (ε, 715). The mass spectrum was confirmatory for the formula Mn(PH$_3$)Br(CO)$_4$ by showing a parent peak at 280 and 282 (due to $^{79}$Br and $^{81}$Br) and then consecutive peaks corresponding to the loss of each of the four CO groups.

EXAMPLE V

Mn(PH$_3$)$_2$Br(CO)$_3$

Phosphine was bubbled slowly through an orange refluxing solution of 6.7 g. (0.024 mole) of Mn(CO)$_5$Br in 100 ml. of tetrahydrofuran for 1.5 hrs. The resulting clear, dark orange solution was flushed with nitrogen and the solvent was removed under vacuum. The orange solid residue was extracted with 200 ml. of benzene and the extract was chromatographed on Woelm Grade 1 neutral alumina. Elution with benzene followed by benzene/CH$_2$Cl$_2$, CH$_2$Cl$_2$ and THF gave ca. 700 ml. of a pale yellow eluate. Solvent removal gave ca. 0.1 g. of yellow-orange solid which was identified as

Mn(PH$_3$)Br(CO)$_4$ by comparison of infrared spectra.

The benzene-insoluble portion was then extracted with 75 ml. of CH$_2$Cl$_2$, and the resulting orange extract was diluted with 150 ml. of n-heptane. Upon concentrating the solution (rotary evaporator), orange crystals formed which were collected and washed with n-heptane. Further purification was achieved by dissolving the crude product (2.8 g.) in 75 ml. of CH$_2$Cl$_2$, filtering and adding 100 ml. n-hexane. On standing at 25° C. for 2 hrs. and at −25° C. for 2 hrs., the clear orange solution deposited orange crystals which were collected and dried at 25° C./0.1μ/16 hrs. to give 2.0 g. (29% yield) of

Mn(PH$_3$)$_2$Br(CO)$_3$ which decomposed at 209–232° C. An additional 0.6 g. was obtained by concentration of the filtrate.

*Analysis.*—Calcd. for C$_3$H$_6$BrMnO$_3$P$_2$ (percent): C, 12.5; H, 2.1; Br, 27.8; Mn, 19.1; P, 21.2. Found (percent): C, 13.1; H, 1.9; Br, 29.7; Mn, 18.5; P, 21.2.

The complex dissolved in CH$_2$Cl$_2$, CHCl$_3$ and tetrahydrofuran, and was slightly soluble in benzene but insoluble in hexane. In the solid state, it decomposed only slowly in air and it was moderately stable in solution.

The infrared spectrum of a Nujol mull showed $\nu_{PH}$ at 2392 (s) and 2358 (m) and $\delta_{PH}$ at 1015 (s) and 991 (s) cm.$^{-1}$ while a CHCl$_3$ solution showed $\nu_{CO}$ at 2105 (vw), 2049 (s), 2033 (sh), 1992 (s), 1946 (s) cm.$^{-1}$. The $^1$H n.m.r. spectrum in CDCl$_3$ showed the P-H protons as a doublet of complex multiplets centered at τ5.74 with J$_{P-H}$=ca. 350 Hz.

EXAMPLE VI

W(PH$_3$)$_2$(CO)$_4$

Air was displaced from a 240-ml. shaker tube, and the tube was charged with 1.6 g. of

[(CH$_3$)$_4$N][W(CO)$_4$B$_3$H$_8$]

1.0 g. of PH$_3$, and 25 ml. of tetrahydrofuran, and the mixture was allowed to react for 1 hour at 70° C. The reaction product was filtered, and the filtrate was evaporated to dryness giving a residue which was sublimed in vacuo at 75° C. The sublimate was resublimed at 60–80° C./0.001 mm. pressure. The product had the analysis:

*Analysis.*—Calcd. for W(PH$_3$)$_2$(CO)$_4$ (percent): C, 13.2; H, 1.7. Found (percent): C, 15.1; H, 1.3.

The mass spectrum of the product agreed with the above formula and its infrared absorption spectrum showed a band at 2400 cm.$^{-1}$ (P-H stretch), a strong CO absorption region, and strong bands at 1015 and 1000 cm.$^{-1}$. The latter two bands are probably deformation modes.

EXAMPLE VII

Cr(PH$_3$)$_3$(CO)$_3$

Phosphine was bubbled slowly through a yellow slurry of 6.8 g. (0.0262 mole) of (CH$_3$CN)$_3$Cr(CO)$_3$ in 120 ml. of tetrahydrofuran at 0° C. for 15 min. and at 25° for 0.5 hr. to give a dark yellow solution. The solution was filtered, the filtrate was concentrated to ca. 50 ml. (rotary evaporator), and 100 ml. of n-heptane was added. Additional concentration to ca. 75 ml. gave yellow crystals which were collected and washed with n-heptane. The crude crystals were purified by dissolution in 150 ml. of benzene and precipitation by addition of 400 ml. of n-hexane to the yellow extract. The yellow crystalline precipitate was collected, washed with n-hexane and dried at 25° C./0.1μ/16 hrs. to give 2.6 g. of Cr(PH$_3$)$_3$(CO)$_3$, which decomposed at 128–145° C.

*Analysis.*—Calcd. for C$_3$H$_9$CrO$_3$P$_3$ (percent): C, 15.1; H, 3.8; Cr, 21.9; O, 20.2; P, 39.0. Found (percent): C, 15.3; H, 3.7; Cr, 21.2; O, 20.4; P, 39.7.

Concentration of the filtrate to ca. 75 ml. followed by addition of 200 ml. of n-hexane precipitated an additional 1.1 g. with identical melting point and infrared spectrum for a total yield of 3.7 g. (60% of theory).

The solid complex decomposed slowly in air; solutions were more sensitive to air but decomposition was not rapid. The product was soluble in tetrahydrofuran, benzene, chloroform and dichloromethane, and only slightly soluble in hexane and diethyl ether.

The infrared spectrum (Nujol) showed $\nu_{PH}$ at 2342 (m) and 2326 (sh) cm.$^{-1}$, $\nu_{CO}$ at 1938 (s) and 1822 (vs) cm.$^{-1}$, and $\delta_{PH}$ at 1032 (m), 1007 (s) cm.$^{-1}$; a hexane solution showed $\nu_{CO}$ at 1969 (s) and 1890 (s) cm.$^{-1}$. The $^1$H n.m.r. spectrum showed PH$_3$ protons at τ7.10 (C$_6$D$_6$) or τ6.34 (CDCl$_3$) as a symmetrical doublet of complex multiplets. Each multiplet consisted of four lines (J$_{P-H}$=ca. 13 Hz.) of successively decreasing intensity with the most intense lines at high- and low-field of the overall doublet pattern. The splitting between the strongest lines was 330 Hz.

EXAMPLE VIII

Mo(PH₃)₃(CO)₃

Phosphine was slowly bubbled through a yellow slurry of 3.0 g. (0.010 mole) of (CH₃CN)₃Mo(CO)₃ in 80 ml. of tetrahydrofuran at 0° C. for 15 min. for 1.5 hrs. at 25° C. to give a pale yellow solution. The system was flushed with nitrogen and solvents were removed under vacuum. The off-white residue was extracted with 150 ml. of benzene at 25° C. and 100 ml. of n-heptane was added to the filtrate. Concentration of the solution to ca. 75 ml. (rotary evaporator) followed by the addition of 75 ml. of n-heptane gave an off-white crystalline solid. This product was dried at 25° C./0.1μ/16 hrs. to give 1.8 g. (64% yield) of Mo(PH₃)₃(CO)₃, which decomposed at 126–147° C.

*Analysis.*—Calcd. for C₃H₉MoO₃P₃ (percent): C, 12.8; H, 3.2; Mo, 34.1; O, 17.0; P, 32.8. Found (percent): C, 13.0; H, 3.2; Mo, 33.8; O, 17.1; P, 33.1.

The solid complex decomposed only slowly in air over a period of several weeks; solutions decomposed in a matter of hours when exposed to air. The product dissolved in benzene, tetrahydrofuran, dichloromethane and chloroform but was only slightly soluble in diethyl ether and saturated hydrocarbons.

The infrared spectrum of a Nujol mull showed $\nu_{PH}$ at 2353 (sh) and 2347 (m) cm.⁻¹, $\nu_{CO}$ at 1961 (s) and 1842 (vs) cm.⁻¹, and $\delta_{PH}$ at 1020 (s) and 998 (s) cm.⁻¹ while solutions in hexane had $\nu_{CO}$ at 1980 and 1901 cm.⁻¹. The proton n.m.r. spectrum showed PH₃ protons at τ6.45 in CDCl₃ or τ7.28 in C₆D₆ as a doublet of complex multiplets of similar structure as described above for

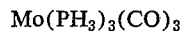

Cr(PH₃)₃(CO)₃

The splitting of the two large peaks was 325 Hz. while the smaller splitting in the multiplets was ca. 11 Hz. The ³¹P n.m.r. spectrum of a THF solution showed a quartet of complex multiplets centered at +6205 Hz. from external H₃PO₄ with J$_{P-H}$=305 Hz. The fine structure of the multiplets was not resolved.

EXAMPLE IX

W(PH₃)₃(CO)₃

A 400 ml. stainless steel bomb was charged with 5.0 g. (0.128 mole) of (CH₃CN)₃W(CO)₃ and 100 ml. of tetrahydrofuran. The bomb was closed, cooled to −78° C., evacuated, and 15.0 g. (0.44 mole) of PH₃ was condensed therein under pressure. The bomb was closed and agitated at 50° C. for 12 hrs. After the excess pressure was vented, the bomb was flushed with nitrogen and the pale blue slurry was discharged and filtered in a nitrogen atmosphere. The yellow filtrate was mixed with 100 ml. of n-heptane and the mixture was concentrated (rotary evaporator) to ca. 100 ml. After addition of 100 ml. of n-heptane and concentration of the mixture, pale green crystalline solid was collected. Additional purification from benzene/heptane and then tetrahydrofuran/heptane utilizing the rotary evaporator gave, after drying at 25° C./0.1μ/16 hrs., 2.4 g. of pale yellow, crystalline

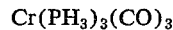

W(PH₃)₃(CO)₃ which decomposed at 150–177° C.

*Analysis.*—Calcd. for C₃H₉O₃P₃W (percent): C, 9.7; H, 2.5; P, 25.1. Found (percent): C, 10.0; H, 2.5; P, 24.9.

The solid compound decomposed in air over a period of weeks; solutions decomposed in several hours. It was moderately soluble in benzene, tetrahydrofuran and chloroform, very slightly soluble in hexane, and insoluble in diethyl ether.

The infrared spectrum (Nujol) showed $\nu_{PH}$ at 2364 (sh) and 2283 (s) cm.⁻¹, $\nu_{CO}$ at 1934 (s) and 1815 (vs) cm.⁻¹ and $\delta_{PH}$ at 1028 (s) and 1004 (s) cm.⁻¹; solutions showed $\nu_{CO}$ at 1950 (w), 1898 (w) cm.⁻¹ (hexane) and 1961 (s), 1873 (vs) cm.⁻¹ (CHCl₃). The ¹H n.m.r. spectrum (C₆D₆) showed the PH₃ resonances at τ7.08 as a doublet of complex multiplets similar to those observed for the Cr and Mo complexes with a splitting of 349 Hz. between the strongest lines and ca. 11 Hz. between the lines of the multiplets. The weakest lines of the multiplets were not observed due to the low solubility of the complex in benzene.

EXAMPLE X

Ni(PH₃)[P(OC₆H₅)₃]₃

Phosphine was bubbled slowly through a refluxing solution of 5.0 g. (0.00384 mole) of [(C₆H₅O)₃P]₄Ni in 150 ml. of tetrahydrofuran for 1 hr. The colorless solution slowly became pale yellow. The mixture was cooled to 25° C., flushed with nitrogen and 100 ml. of n-heptane was added. Concentration of the mixture under vacuum and further addition of 100 ml. of n-heptane produced a white solid which was collected and washed with n-heptane. This crude product (3.7 g.) was crystallized from 250 ml. of boiling n-heptane, and the white crystals were dried at 25° C./0.1μ/16 hrs. to give 2.5 g. (64% yield) of Ni(PH₃)[P(OC₆H₅)₃]₃, which decomposed upon heating to 120–160° C.

*Analysis.*—Calcd. for C₅₄H₄₈NiO₉P₄ (percent): C, 63.3; H, 4.7; Ni, 5.7; O, 14.1; P, 12.1. Found (percent): C, 64.2; H, 4.74; Ni, 5.4; O, 13.9; P, 11.6.

On exposure to air, the solid complex decomposed only slowly while solutions of the complex decomposed more rapidly. The complex was moderately soluble in benzene, tetrahydrofuran, and dichloromethane and slightly soluble in diethyl ether and n-heptane at 25° C.

The infrared spectrum (Nujol) showed $\nu_{PH}$ at 2347 (m) and 2309 (m) cm.⁻¹, $\delta_{PH}$ at 1019 (s) cm.⁻¹, and bands characteristic of (C₆H₅O)₃P. The ¹H n.m.r. spectrum (CD₂Cl₂) showed aromatic protons at τ2.97 (multiplet) and PH₃ protons as a doublet (J$_{P-H}$=299 Hz.) of quartets (J$_{P'-H}$=18 Hz.) centered at τ8.04.

EXAMPLE XI

Ni(PH₃)₂[P(OC₆H₅)₃]₂

A 500 ml. two-neck flask fitted with a vacuum stopcock adapter and serum cap was charged with 3.0 g. (0.0109 mole) of (1,5 - cyclooctadiene)₂Ni and 100 ml. of tetrahydrofuran. The yellow mixture was frozen in liquid nitrogen and evacuated. A solution of 6.4 g. (0.0206 mole) of (C₆H₅O)₃P in 20 ml. of tetrahydrofuran was added to the frozen mixture through the serum cap with a hypodermic syringe, possibly forming Ni(cyclooctadiene)[P(OC₆H₅)₃]₂ as an intermediate, and phosphine (0.034 mole) was condensed in. The mixture was warmed to 25° C. and stirred for 2.5 hrs. resulting in a grayish color. The mixture was transferred to a dry box, and filtered by nitrogen pressure. Addition of n-heptane (200 ml.) to the filtrate and concentration of the solution gave a gray solid. Purification of the crude product was effected by extraction with 400 ml. of diethyl ether, filtration by nitrogen pressure, addition of 300 ml. of n-hexane to the filtrate, cooling to −78° C./ 4.5 hrs. and collection of the resulting crystals at −78° C. This procedure was repeated and the white needle-like crystals were dried at 25° C./0.1μ/6 hrs. to give 3.61 g. (44% yield) of Ni(PH₃)₂[P(O₆H₅)₃]₂ which decomposed at 85° C.

*Analysis.*—Calcd. for C₃₆H₃₆NiO₆P₄ (percent): C, 57.8; H, 4.9; Ni, 7.9; P, 16.6. Found (percent): C, 57.7; H, 4.7; Ni, 7.6; P, 16.0.

The complex was soluble in diethyl ether, tetrahydrofuran and benzene and slightly soluble in hexane. Solutions of the complex decomposed slowly on standing at 25° C. even under nitrogen and rapidly upon heating or exposure to air. The solid decomposed slowly in air.

The infrared spectrum (Nujol) showed $\nu_{PH}$ at 2336 (m) and 2304 (m) cm.⁻¹. The $\delta_{PH}$ bands cannot be assigned because of the interference of the $(C_6H_5O)_3P$ bands. The $^1H$ n.m.r. spectrum showed the aromatic protons at $\tau 2.78$ (multiplet) and the $PH_3$ protons as a doublet ($J_{P-H}=316$ Hz.) of triplets ($J_{P'-H}=19$ Hz.) centered at $\tau 7.45$. The $^1H$ n.m.r. spectrum indicated the presence of ca. 5% of $Ni(PH_3)[P(OC_6H_5)_3]_3$.

EXAMPLE XII

$Ni(PH_3)_3[P(OC_6H_5)_3]$

A 500 ml. two-neck flask fitted with a vacuum-stopcock adapter, serum cap, and magnetic stirring bar was charged with 1.5 g. (0.00545 mole) of (1,5-cyclo-octadiene)$_2$Ni, and 60 ml. of diethyl ether. The yellow slurry was frozen in liquid nitrogen and evacuated. A solution of 1.6 g. (0.00517 mole) of $(C_6H_5O)_3P$ in 15 ml. of diethyl ether was added to the still frozen mixture through the serum cap with a hypodermic syringe, possibly forming $$Ni(cyclooctadiene)[(C_2H_5)_2O][P(OC_6H_5)_3]$$

as an intermediate, and phosphine (0.0221 mole) was condensed in. The mixture was stirred at $-78°$ C. for 15 min. and then at $-15$ to $-20°$ C. for 0.5 hr. during which the yellow slurry changed to a colorless solution containing some gray solid. Pressure was raised to 1 atm. with nitrogen, the mixture was filtered at $-20°$ C., and the filtrate was collected in a flask cooled to $-78°$ C. The separated gray solid was identified as $$Ni(PH_3)_2[P(OC_6H_5)_3]_2$$

by comparison of infrared spectra. After 1.5 hrs. at $-78°$ C., the filtrate deposited an off-white, crystalline solid mixed with some black solid. The crystals were collected at $-78°$ C., dried at $-78°$ C. in a nitrogen stream for 0.5 hr., and then further dried at $-25°$ C./ 0.15 mm./30 min. The product was a pale-yellow crystalline solid contaminated with a small amount of black solid. A Nujol infrared spectrum was quickly taken (at 15° C.) and showed $\nu_{PH}$ at 2305 (s) cm.$^{-1}$ and $\delta_{PH}$ at 1000 (vs) cm.$^{-1}$ and bands characteristic of $(C_6H_5O)_3P$; no bands due to 1,5-cyclooctadiene were observed. The spectrum differed from those obtained for $$Ni(PH_3)[P(OC_6H_5)_3]_3$$

and $Ni(PH_3)_2[P(OC_6H_5)_3]_2$. The product decomposed after several minutes at 25° C. and was therefore not analyzed. Formulation of the product as $$Ni(PH_3)_3[P(OC_6H_5)_3]$$

is based on the method of preparation and the infrared spectral comparisons. Solutions of the compound in diethyl ether became black at ca. $-10°$ C., the solid decomposed after 1 hr. at 0° C. and several minutes at 25° C. with liberation of the characteristic odor of $PH_3$.

EXAMPLE XIII

$Ni(PH_3)[P(C_6H_5)_3]_3$

A red-brown slurry of 4.4 g. (0.004 mole) of $$[(C_6H_5)_3P]_4Ni$$

and 60 ml. of diethyl ether was degassed in a vacuum line, frozen in liquid nitrogen, and 0.0045 mole of $PH_3$ was condensed in. The mixture was warmed and stirred at 25° C. for 15 min. during which a yellow, crystalline solid was formed. The mixture was then stirred at 0° C. for 15 min. and filtered. The yellow solid was dried at 25° C./0.01$\mu$/2 hrs. to give 2.4 g. (69% yield) of $$Ni(PH_3)[P(C_6H_5)_3]_3$$

which decomposed above 70° C.

*Analysis.*—Calcd. for $C_{54}H_{48}NiP_4$ (percent): C, 73.6; H, 5.5; Ni, 6.7; P, 14.1. Found (percent): C, 73.0; H, 5.6; Ni, 6.5; P, 13.0.

The complex decomposed on exposure to air whether as a solid or in solution; solutions decomposed slowly as 25° C. even in the absence of air. The complex was moderately soluble in benzene and tetrahydrofuran, slightly soluble in diethyl ether and insoluble in n-hexane.

The infrared spectrum (Nujol) showed $\nu_{PH}$ at 2273 (s) cm.$^{-1}$, $\delta_{PH}$ at 1025 (sh) and 1015 (s) cm.$^{-1}$, and bands characteristic of $(C_6H_5)_3P$. Solutions in $C_6D_6$ were too dilute for observation of the $PH_3$ $^1H$ n.m.r. resonance.

EXAMPLE XIV

$Ni(PH_3)_2[P(C_6H_5)_3]_2$

Phosphine was bubbled solwly through a red-brown slurry of 4.5 g. (0.0036 mole) of $[(C_6H_5)_3P]_4Ni$ in 80 ml. of diethyl ether at 0-5° C. for 1.5 hrs. The resulting yellow slurry was flushed briefly with nitrogen, filtered at $-10°$ C., and the yellow crystalline solid was washed with diethyl ether and dried at 25° C./0.1$\mu$/16 hrs. to give 1.8 g. (68% yield) of $Ni(PH_3)_2[P(C_6H_5)_3]_2$, which decomposed at 90-108° C.

*Analysis.*—Calcd. for $C_{36}H_{36}NiP_4$ (percent): C, 66.3; H, 5.6; Ni, 9.0; P, 19.1. Found (percent): C, 66.1; H, 5.7; Ni, 9.1; P, 18.3.

Upon exposure to air the solid compound decomposed only after several hours while solutions decomposed within minutes. The solid was soluble in benzene and tetrahydrofuran and insoluble in diethyl ether and n-hexane.

The infrared spectrum showed $\nu_{PH}$ at 2278 (sh) and 2262 (s) cm.$^{-1}$, $\delta_{PH}$ at 1083 (s), 1077 (sh) and 1053 (s) cm.$^{-1}$, and bands characteristic of $(C_6H_5)_3P$. The $^1H$ n.m.r. spectrum ($C_6D_6$) showed the aromatic protons as a multiplet at $\tau 2.83$ and the $PH_3$ protons as a doublet ($J_{P-H}=290$ Hz.) of triplets ($J_{P'H}=14$ Hz.) centered at $\tau 3.46$.

EXAMPLE XV

$Cr(PH_3)_2(CO)_4$

An 800 ml. stainless steel pressure bomb was charged with 49.3 g. (0.134 mole) of $$Cr(CO)_4[(CH_3)_3C-S-CH_2CH_2-S-C(CH_3)_3]$$

450 ml. of tetrahydrofuran and 25 g. (0.74 mole) of phosphine. The solution was heated to 65° C. and kept at this temperature for 8 hrs. After removal of unreacted phosphine and solvent, the crude product was dissolved in 500 ml. of ether and the solution was filtered through Celite® filter aid. After removal of about 400 ml. of ether under reduced pressure, 28.0 g. pale yellow crystals were collected on a filter and dried at 25° C. at 0.1 mm. pressure for 16 hrs.

*Analysis.*—Calcd. for $Cr(PH_3)_2(CO)_4$ (percent): C, 20.7; H, 2.61; Cr, 22.4; O, 27.6; P, 26.7. Found (percent): C, 20.7; H, 2.79; Cr, 22.0; O, 27.1; P, 27.2.

The infrared spectrum (Nujol mull) exhibited strong P-H absorption at 2400, 1035 and 1015 cm.$^{-1}$.

EXAMPLE XVI

$Mo(PH_3)_2(CO)_4$

The procedure of Example XV was used with 67.0 g. (0.157 mole) of $$Mo(CO)_4[(CH_3)_3C-S-CH_2CH_2-S-C(CH_3)_3]$$

35 g. (1.0 mole) of phosphine and 400 ml. of tetrahydrofuran. The crude product was recrystallized from ether/petroleum ether and then sublimed under vacuum; yield, 15 g. The $^1H$ n.m.r. spectrum ($CD_2Cl_2$) showed that the product consisted of about 80%

$$Mo(PH_3)_2(CO)_4$$

and 20% $Mo(PH_3)(CO)_5$.

EXAMPLE XVII

W(PH$_3$)$_2$(CO)$_4$

The procedure of Example XV was used with 60 g. (0.12 mole) of

W(CO)$_4$[(CH$_3$)$_3$C—S—CH$_2$CH$_2$—S—C(CH$_3$)$_3$]

30 g. (0.91 mole) of phosphine and 400 ml. of tetrahydrofuran. After removal of part of the tetrahydrofuran, the slurry was extracted with water and the crude product was collected on a filter. This off-white solid was recrystallized from ether/heptane; yield 15.0 g. The $^1$H n.m.r. spectrum (CD$_2$Cl$_2$) showed that the product consisted of about 78% W(PH$_3$)$_2$(CO)$_4$ and 22% W(PH$_3$)(CO)$_5$.

EXAMPLE XVIII

Cr(PH$_3$)(CO)$_5$

Gaseous phosphine was passed into a solution of 56.0 g. (0.159 mole) of [(C$_2$H$_5$)$_4$N][ClCr(CO)$_5$] in 300 ml. of methanol for 2 hrs. at 0° C. After removal of part of the methanol under reduced pressure and upon cooling to about −40° C., pale yellow crystals formed which were collected on a filter; yield, 38.0 g.

*Analysis.*—Calcd. for Cr(PH$_3$)(CO)$_5$ (percent): C, 26.4; H, 1.33; Cr, 22.9; O, 35.2; P, 14.1. Found (percent): C, 26.9; H, 1.86; Cr, 22.4; O, 36.0; P, 13.4.

Cr(PH$_3$)(CO)$_5$ is soluble in common organic solvents and sublimes readily at 50° C./0.01 mm. The infrared spectrum of Cr(PH$_3$)(CO)$_5$ in a mineral oil mull showed a band at 2380 cm.$^{-1}$ and one at 1035 cm.$^{-1}$ which are assigned to the P-H stretching and the P-H bending modes, respectively. The $^1$H n.m.r. spectrum of Cr(PH$_3$)(CO)$_5$ in a saturated C$_6$D$_6$ solution showed a doublet at $\tau$7.49 with J$_{P-H}$=328 Hz.

In Table I below, the left-hand column lists precursor transition metal complexes which can be reacted with phosphine following the procedure of the example in the middle column to give the product in the right-hand column. As explained earlier the extent of PH$_3$ substitution depends to some extent upon the exact reaction conditions, and products formulated in the right-hand column as possessing the depicted PH$_3$ content may at times be formed along with one or more compounds with different combined PH$_3$ content, it being understood that such products fall within the scope of the invention.

TABLE I

| Reactant | Process Example | Product |
|---|---|---|
| [W(CO)$_4$(CNC$_6$H$_5$)Cl][N(C$_2$H$_5$)$_4$] | XVIII | W(PH$_3$)(CO)$_4$(CNC$_6$H$_5$) |
| W($\pi$-C$_5$H$_5$)(CO)$_3$Cl | V | W(PH$_3$)Cl(CO)$_2$($\pi$-C$_5$H$_5$)+W(PH$_3$)$_2$Cl(CO)($\pi$-C$_5$H$_5$) |
| Co(H)[P(OC$_6$H$_5$)$_3$]$_4$ | X | Co(PH$_3$)(H)[P(OC$_6$H$_5$)$_3$]$_3$ |
| Co(H)[P(OC$_2$H$_5$)$_3$]$_4$ | X | Co(PH$_3$)(H)[P(OC$_2$H$_5$)$_3$]$_3$ |
| MnI(CO)$_4$[As(C$_2$H$_5$)$_3$] | IV | Mn(PH$_3$)I(CO)$_3$[As(C$_2$H$_5$)$_3$] |
| MnBr(CO)$_4$[PH(C$_6$H$_5$)$_2$] | IV | Mn(PH$_3$)Br(CO)$_3$[PH(C$_6$H$_5$)$_2$] |
| Co(CH$_3$)(CO)$_4$ | XIV | Co(PH$_3$)(CH$_3$)(CO)$_3$ |
| [MoBr(CO)$_5$][N(C$_2$H$_5$)$_4$] | XVIII | Mo(PH$_3$)(CO)$_5$ |
| Cr(CO)$_5$(NCCH$_3$) | VII | Cr(PH$_3$)(CO)$_5$ |
| Re(C$_6$H$_5$)(CO)$_5$ | XIV | Re(PH$_3$)(C$_6$H$_5$)(CO)$_4$ |
| Ni[P(OC$_2$H$_5$)$_2$(C$_6$H$_5$)]$_4$ | X | Ni(PH$_3$)[P(OC$_2$H$_5$)$_2$(C$_6$H$_5$)]$_3$ |
| FeI(CO)$_2$($\pi$-C$_5$H$_5$) | V | Fe(PH$_3$)I(CO)($\pi$-C$_5$H$_5$) |
| Cr[(C$_6$H$_5$)$_2$PCH$_2$CH$_2$P(C$_6$H$_5$)$_2$](CO)$_4$ | V | Cr(PH$_3$)(CO)$_3$[(C$_6$H$_5$)$_2$PCH$_2$CH$_2$P(C$_6$H$_5$)$_2$] |
| Cr(CO)$_5$[(C$_6$H$_5$)$_3$P] | V | Cr(PH$_3$)(CO)$_4$[P(C$_6$H$_5$)$_3$] |
| Mo(CO)$_4$[(C$_6$H$_5$)$_2$PCH$_2$CH$_2$P(C$_6$H$_5$)$_2$] | V | Mo(PH$_3$)(CO)$_3$[(C$_6$H$_5$)$_2$PCH$_2$CH$_2$P(C$_6$H$_5$)$_2$] |
| Mo(C$_2$H$_5$)(CO)$_3$($\pi$-C$_5$H$_5$) | V | Mo(PH$_3$)(C$_2$H$_5$)(CO)$_2$($\pi$-C$_5$H$_5$) |
| Mo(CO)$_5$[P(CH$_3$)$_3$] | V | Mo(PH$_3$)(CO)$_4$[P(CH$_3$)$_3$] |
| Mo(CO)$_3$(cycloheptatriene) | XVII | Mo(PH$_3$)$_3$(CO)$_3$ |
| Mo(CO)$_4$(norbornadiene) | XVII | Mo(PH$_3$)$_2$(CO)$_4$ |
| W(CO)$_5$[As(C$_6$H$_5$)$_3$] | V | W(PH$_3$)(CO)$_4$[As(C$_6$H$_5$)$_3$] |
| W(CO)$_4$[(CH$_3$)$_2$(C$_6$H$_5$)P]$_2$ | V | W(PH$_3$)(CO)$_3$[(CH$_3$)$_2$(C$_6$H$_5$)P]$_2$ |
| W(H)(CO)$_3$(p-C$_5$H$_5$) | V | W(PH$_3$)(H)(CO)$_2$($\pi$-C$_5$H$_5$) |
| Mn(CO)$_3$($\pi$-C$_5$H$_5$) | V | Mn(PH$_3$)(CO)$_2$($\pi$-C$_5$H$_5$) |
| Re(CO)$_5$Br | V | Re(PH$_3$)$_2$Br(CO)$_3$ |
| Re(CO)$_5$I | V | Re(PH$_3$)I(CO)$_4$+Re(PH$_3$)$_2$I(CO)$_3$ |
| Re(CO)$_4$Br[P(OC$_6$H$_5$)$_3$] | V | Re(PH$_3$)Br(CO)$_3$[P(OC$_6$H$_5$)$_3$] |
| Re(CO)$_5$(CH$_3$) | V | Re(PH$_3$)(CH$_3$)(CO)$_4$ |
| Co[P(C$_6$H$_5$)$_3$]$_3$(N$_2$)H | XIII | Co(PH$_3$)(H)[P(C$_6$H$_5$)$_3$]$_3$ |
| Ni(CO)$_2$[P(OC$_6$H$_5$)$_3$]$_2$ | X | Ni(PH$_3$)(CO)[P(OC$_6$H$_5$)$_3$]$_2$ |
| Ni(CO)(C$_5$H$_{11}$NC)$_3$ | X | Ni(PH$_3$)(CO)(C$_6$H$_{11}$NC)$_2$ |
| Fe(CO)$_3$(norbornadiene)-[P(CH$_2$CH$_3$)$_3$] | I | Fe(PH$_3$)$_2$(CO)$_2$[P(CH$_2$CH$_3$)$_3$] |
| Fe(CO)$_2$(CH$_3$NC)$_3$ | VII | Fe(PH$_3$)$_2$(CO)$_3$ |
| MnBr(CO)$_4$[As(CH$_3$)$_3$] | IV | Mn(PH$_3$)$_2$Br(CO)$_2$[As(CH$_3$)$_3$] |
| Mn(CO)$_2$[(C$_2$H$_5$)$_3$As]($\pi$-CH$_3$C$_5$H$_4$) | IV | Mn(PH$_3$)(CO)[As(C$_2$H$_5$)$_3$]($\pi$-CH$_3$C$_5$H$_4$) |
| Fe(CO)$_4$[As(C$_6$H$_5$)$_3$] | IV | Fe(PH$_3$)(CO)$_3$[As(C$_6$H$_5$)$_3$] |
| Fe(CO)$_3$[As(C$_6$H$_5$)$_3$]$_2$ | IV | Fe(PH$_3$)(CO)$_2$[As(C$_6$H$_5$)$_3$]$_2$ |
| Ni[As(C$_6$H$_5$)$_3$]$_4$ | XIII | Ni(PH$_3$)[As(C$_6$H$_5$)$_3$]$_3$ |
| ReCl(CO)$_3$[As(C$_6$H$_5$)$_3$]$_2$ | IV | Re(PH$_3$)$_2$Cl(CO)[As(C$_6$H$_5$)$_3$]$_2$ |

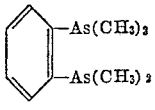

| Reactant | Process Example | Product |
|---|---|---|
| Fe(CO)$_3$[(C$_6$H$_5$)$_2$AsCH$_2$CH$_2$As(C$_6$H$_5$)$_2$] | X | Fe(PH$_3$)(CO)$_2$[(C$_6$H$_5$)$_2$AsCH$_2$CH$_2$As(C$_6$H$_5$)$_2$] |
| MnI(CO)$_3$[Sb(CH$_3$)$_3$]$_2$ | IV | Mn(PH$_3$)$_2$I(CO)[Sb(CH$_3$)$_3$]$_2$ |
| Mo(CO)$_3$[Sb(C$_2$H$_5$)$_3$]$_3$ | IV | Mo(PH$_3$)$_2$(CO)$_2$[Sb(C$_2$H$_5$)$_3$]$_2$ |
| Fe(CO)$_3$[Sb(C$_6$H$_5$)$_3$][P(C$_6$H$_5$)$_3$] | IV | Fe(PH$_3$)(CO)$_2$[Sb(C$_6$H$_5$)$_3$][P(C$_6$H$_5$)$_3$] |
| Ni[Sb(C$_6$H$_5$)$_3$]$_4$ | XIV | Ni(PH$_3$)$_2$[Sb(C$_6$H$_5$)$_3$]$_2$ |
| Mn(CO)[Sb(C$_6$H$_{11}$)$_3$]$_2$($\pi$-CH$_3$C$_5$H$_4$) | IV | Mn(PH$_3$)[Sb(C$_6$H$_{11}$)$_3$]$_2$($\pi$-CH$_3$C$_5$H$_4$) |
| Mn(CO)$_2$[Sb[2,4,6-(CH$_3$)$_3$C$_6$H$_2$]$_3$][$\pi$-(C$_4$H$_9$)$_2$C$_5$H$_3$] | X | Mn(PH$_3$)$_2$[Sb[2,4,6-(CH$_3$)$_3$C$_6$H$_2$]$_3$][$\pi$-(C$_4$H$_9$)$_2$C$_5$H$_3$] |

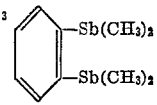

TABLE I—Continued

| Reactant | Process Example | Product |
|---|---|---|
| Cr(CO)₄ 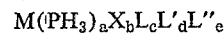 | IV | Cr(PH₃)₂(CO)₂ 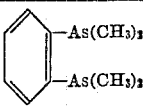 |
| Co(C₆H₅)(CO)₂[P(C₆H₅)₃] | X | Co(PH₃)(C₆H₅)(CO)₂[P(C₆H₅)₃] |
| Mn(CO)₃(C₅H₄)(π-C₅H₅) | IV | Mn(PH₃)(CO)₂(π-C₅H₅) |
| W(CO)₅(2-butene) | IV | W(PH₃)(CO)₅ |
| Fe(CO)₄(CH₃CH=CH₂) | IV | Fe(PH₃)(CO)₄ |
| Mn(CO)₂(2-methyl-3-ethylhexene-1)(π-C₅H₅) | IV | Mn(PH₃)(CO)₂(π-C₅H₅) |
| W(CO)₅(cyclohexene) | IV | W(PH₃)(CO)₅ |
| Cr(CO)₅[(C₆H₅)₂(1-C₁₀H₇)P] | V | Cr(PH₃)(CO)₄[(C₆H₅)₂(1-C₁₀H₇)P] |
| Ni[P(OC₆H₁₁)₃]₄ | X | Ni(PH₃)[P(O₆H₁₁)₃]₃ |
| Cr(CO)₃(cycloheptatriene) | XVII | Cr(PH₃)₃(CO)₃ |
| Fe(CO)₃(C₁₇H₃₅NC)₂ | VII | Fe(PH₃)₂(CO)₃ |

The compounds of this invention are useful as catalysts for the oligomerization of unsaturated compounds such as acetylene, 1,3-butadiene or mixtures thereof.

The compounds of this invention are labile and frequently decompose when heated to or above 100° C. to produce phosphine. Thus some of the compounds serve as convenient sources of phosphine. Phosphine is a poisonous, foul-smelling and flammable gaseous substance which is difficult to prepare. The phosphine complexes are solids which in most cases can be handled in air and used as a convenient source of phosphine.

The utility of the compounds of this invention as catalysts is further illustrated by the following examples.

EXAMPLE A

In a Carius tube was sealed under nitrogen, 0.3 g. of Mn(PH₃)Br(CO)₄, 50 ml. of benzene and 20 g. of 1,3-butadiene. The tube was heated 2 hrs. at 50° C., 2 hrs. at 100° C. and 6 hrs. at 150° C. The tube was cooled and opened and the contents were distilled. The product consisted of 65.5 g. of clear colorless distillate which was shown by gas chromatography to be a benzene solution of 1,3-butadiene oligomers. The residue consisted of 4.5 g. of a green-gray gummy polymer.

EXAMPLE B

A stainless steel tube was charged with 0.1 g. of

Ni(PH₃)[P(C₆H₅)₃]₃

10 ml. of toluene, 2.0 g. of ethylene, and 2.0 g. of acetylene. The tube was heated for 2 hrs. at 50° C. and 8 hrs. at 120° C. The tube was cooled and opened and the contents distilled. The distillate consisted of 10.0 g. of a pale yellow liquid which was shown by gas chromatography to contain a significant amount of benzene and a trace of styrene.

EXAMPLE C

A stainless steel tube was charged with 0.1 g. of

Ni(PH₃)[P(C₆H₅)₃]₃

10 ml. of benzene and 4.0 g. of 1,3-butadiene. The tube was heated for 2 hrs. at 50° C., 20 hrs. at 101° C., and 2 hrs. at 150° C. The tube was cooled and opened and the filtered contents were distilled. The residue consisted of 1.4 g. of a gray gummy polymer which was identified as polybutadiene from its infrared spectrum.

EXAMPLE D

A stainless steel tube was charged with 0.1 g. of

Ni(PH₃)₂[P(OC₆H₅)₃]₂

10 ml. of benzene and 4.0 g. of 1,3-butadiene. The tube was heated for 2.0 hrs. at 50° C., 2.0 hrs. at 101° C., and 8.0 hrs. at 150° C. The tube was cooled and opened and the filtered contents were distilled. The residue consisted of 1.1 g. of a brown gummy polymer which was shown by infrared spectroscopy to contain trans-polybutadiene.

The embodiments of the invention in which an exclusive property or privilege is claimed are defined as follows:

1. A compound of the formula $$M(PH_3)_a X_b L_c L'_d L''_e$$

wherein

M is a transition metal of atomic number 24–28, 42, 43, 74 and 75;

X is selected from the group of 1-electron donor ligands comprising Cl, Br, I, H, alkyl of up to 6 carbon atoms, aralkyl of up to 12 carbon atoms, and aryl and alkaryl of up to 14 carbon atoms;

L is selected from the group of 2-electron donor ligands comprising

CO,

RNC, wherein R is aryl of up to 14 carbon atoms or alkyl of up to 18 carbon atoms, and $ZR^1R^2R^3$, wherein Z is phosphorus, arsenic, or antimony, $R^1$, $R^2$ and $R^3$ are selected from the group consisting of alkyl and cycloalkyl of up to 6 carbon atoms and aryl, alkaryl, and aralkyl of up to 14 carbon atoms, with the proviso that when Z is phosphorus, $R^1$, $R^2$ and $R^3$ can also be selected from the group consisting of alkoxy and aryloxy of up to 12 carbon atoms, or $R^1$ can be hydrogen in which case $R^2$ and $R^3$ are aryl of up to 14 carbon atoms;

L' is selected from the group of 4-electron donor ligands comprising

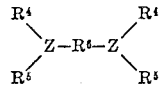

wherein Z is as defined above, $R^4$ and $R^5$ are selected from the group consisting of alkyl and cycloalkyl of up to 6 carbon atoms and aryl, aralkyl, and alkaryl of up to 14 carbon atoms, and $R^6$ is selected from the group consisting of phenylene and alkylene of up to 6 carbon atoms;

L'' is a 5-electron donor ligand selected from π-cyclopentadienyl and hydrocarbyl-substituted π-cyclopentadienyl, wherein hydrocarbyl is free of aliphatic unsaturation and is of up to 6 carbon atoms;

a is 1–3;

c is 0–5; and b, d and e are 0–1; with the provisos that the total number of electrons available from ligands and M metals is equal to 18 and e is 0 when M is Co or Ni; and with the further provisos that at least one of b, d and e is 1 when M is Cr, Mo, or W and L is exclusively CO or CO plus $ZR^1R^2R^3$.

2. A compound of claim 1 of the formula $$M(PH_3)_a L_c$$

wherein

M, L, a and c are as defined in claim 1.

3. A compound of claim 2 wherein L is selected from the group consisting of triphenyl phosphite and triphenyl phosphine.

4. A compound of claim 3 of the formula $$Ni(PH_3)[P(C_6H_5)_3]_3$$

5. A compound of claim 3 of the formula $$Ni(PH_3)_2[P(C_6H_5)_3]_2$$

6. A compound of claim 3 of the formula $$Ni(PH_3)[P(OC_6H_5)_3]_3$$

7. A compound of claim 3 of the formula $$Ni(PH_3)_2[P(OC_6H_5)_3]_2$$

8. A compound of claim 1 of the formula $$M(PH_3)_aX(L)_c$$

wherein

L is CO and M, X, $a$, and $c$ are as defined in claim 1.

9. A compound of claim 8 of the formula $$Mn(PH_3)Br(CO)_4$$

10. A compound of claim 8 of the formula $$Mn(PH_3)_2Br(CO)_3$$

11. A process for preparing a transition metal complex of phosphine comprising contacting and thereby reacting phosphine at or below 150° C. in the absence of air with a solution or suspension of a compound of the formula $$[MX_bQ_fQ'_gL''_hQ''_i(B_3H_8)_j]Q'''_k$$

wherein

M is a transition metal of atomic number 24–28, 42, 43, 74 and 75;

X is selected from the group of 1-electron donor ligands comprising Cl, Br, I, H, alkyl of up to 6 carbon atoms, cycloalkyl of up to 10 carbon atoms, aralkyl of up to 12 carbon atoms, and aryl and alkaryl of up to 14 carbon atoms;

L'' is a 5-electron donor ligand selected from π-cyclopentadienyl and hydrocarbyl-substituted π-cyclopentadienyl, wherein hydrocarbyl is free of aliphatic unsaturation and is of up to 6 carbon atoms;

Q is selected from 2-electron donor ligands consisting of
  CO;
  RNC, wherein R is aryl of up to 14 carbon atoms or alkyl of up to 18 carbon atoms;
  $ZR^1R^2R^3$, wherein Z is phophorus, arsenic, or antimony, $R^1$, $R^2$ and $R^3$ are selected from the group consisting of alkyl and cycloalkyl of up to 6 carbon atoms and aryl, alkaryl, and aralkyl of up to 14 carbon atoms with the proviso that when Z is phosphorus, $R^1$, $R^2$, and $R^3$ can also be selected from the group consisting of alkoxy and aryloxy of up to 12 carbon atoms, or $R^1$ can be hydrogen in which case $R^2$ and $R^3$ are aryl of up to 14 carbon atoms;
  $N_2$;
  acrylic and alicyclic monoolefins of up to 9 carbon atoms; and
  $R^7$—CN and $R^7{_2}O$, wherein $R^7$ is hydrocarbyl free of aliphatic unsaturation of up to 6 carbon atoms;

Q' is selected from 4-electron donor ligands comprising

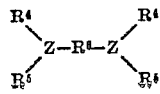

wherein Z is as defined above, $R^4$ and $R^5$ are selected from the group consisting of alkyl and cycloalkyl of up to 6 carbon atoms and aryl, aralkyl, and alkaryl of up to 14 carbon atoms, and $R^6$ is selected from the group consisting of phenylene and alkylene of up to 6 carbon atoms; $R^7$—S—$CH_2CH_2$—S—$R^7$, or a diolefinic hydrocarbon of up to 10 carbon atoms;

Q'' is a 6-electron donor ligand consisting essentially of cyclic triolefins of up to 8 carbon atoms;

$B_3H_8$ is a 3-electron donor ligand;

Q''' is a positively charged cation selected from the group consisting of the alkali metals and $$NR^8R^9R^{10}R^{11}$$

wherein $R^8$ is alkyl and cycloalkyl of up to 6 carbon atoms, aryl, aralkyl, and alkaryl of up to 14 carbon atoms and $R^9$, $R^{10}$ and $R^{11}$, independently, are $R^8$ or hydrogen;

$f$ is 2–6;

$b$, $g$, $h$, $i$, $j$ and $k$ are 0–1; and the total number of electrons available from ligands and M is equal to 18; with the provisos that $j$ and $k$ are 0 when M is other than Cr, Mo, or W;

when $k$ is 1, the total number of electrons available from ligands and M is equal to 17 and the additional electron representing the uninegative charge on the anion satisfies the 18 electron rule;

$h$ is 0 when M is Co or Ni; and at least one additional ligand must be present when CO is present as a ligand.

12. The process of claim 11 wherein the temperature is 75° C. or below.

13. The process of claim 11 wherein phosphine and $[(CH_3)_4N][Mo(CO)_4B_3H_8]$ are reacted together.

14. The process of claim 11 wherein phosphine and $[(CH_3)_4N][W(CO)_4B_3H_8]$ are reacted together.

15. The process of claim 11 wherein phosphine and $[(CH_3)_4N][Cr(CO)_4B_3H_8]$ are reacted together.

16. The process of claim 11 wherein phosphine and $(CH_3CN)_3W(CO)_3$ are reacted together.

17. The process of claim 11 wherein phosphine and $(CH_3CN)_3Cr(CO)_3$ are reacted together.

18. The process of claim 11 wherein phosphine and $(CH_3CN)_3Mo(CO)_3$ are reacted together.

References Cited
UNITED STATES PATENTS 3,117,983  1/1964  Matthews _____ 260—429
3,284,529  11/1966  Feldman et al. _____ 260—677

FOREIGN PATENTS 1,281,474  12/1961  France.

OTHER REFERENCES

Höltje et al.: Z. für Anorg. and Allgem. Chem. 243 (1940), pp. 246–251.

Fischer et al.: Angew. Chem. 80 (1968), pp. 122–3.

TOBIAS E. LEVOW, Primary Examiner

A. P. DEMERS, Assistant Examiner

U.S. Cl. X.R.

23—203 C; 260—94.3, 94.6, 429 R, 429 CY, 438.5 R, 439 R, 439 CY, 666 B, 669 R, 672 R, 672 T

PO-1050
(5/69)

UNITED STATES PATENT OFFICE
CERTIFICATE OF CORRECTION

Patent No. 3,695,853　　　　　Dated　October 3, 1972

Inventor(s)　Frank Karl Klanberg

It is certified that error appears in the above-identified patent and that said Letters Patent are hereby corrected as shown below:

Col. 3, line 7, -- aralkyl -- is misspelled;

Col. 3, line 21, "Co" should be -- CO --;

Col. 7, line 14, -- due -- should be inserted after "bands";

Col. 12, line 15, -- slowly -- is misspelled;

Cols. 13-14, Table I, in the 22nd item under "Reactant", "p" should be replaced with -- $\pi$ --.

Signed and sealed this 3rd day of July 1973.

(SEAL)
Attest:

EDWARD M. FLETCHER, JR.　　　　　Rene Tegtmeyer
Attesting Officer　　　　　　　　Acting Commissioner of Patents